(12) United States Patent
Pfister

(10) Patent No.: US 8,863,866 B2
(45) Date of Patent: Oct. 21, 2014

(54) METHOD FOR TESTING A MOTOR VEHICLE AND A TEST VEHICLE WITH AN ACTIVE SECONDARY VEHICLE

(75) Inventor: Felix Pfister, Graz (AT)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 13/067,931

(22) Filed: Jul. 7, 2011

(65) Prior Publication Data
US 2012/0061154 A1 Mar. 15, 2012

(30) Foreign Application Priority Data

Jul. 12, 2010 (AT) .................... GM440/2010

(51) Int. Cl.
*B60T 13/00* (2006.01)
*G01M 17/007* (2006.01)

(52) U.S. Cl.
CPC ................ *G01M 17/007* (2013.01)
USPC ................ 180/14.2; 73/115.07; 701/70

(58) Field of Classification Search
USPC .............. 180/14.1, 14.2; 73/115.07; 701/70
See application file for complete search history.

(56) References Cited

U.S. PATENT DOCUMENTS

| | | | | |
|---|---|---|---|---|
| 3,245,488 A * | 4/1966 | Peterson | ................ | 180/14.2 |
| 3,783,963 A * | 1/1974 | Erwin | ................ | 180/6.3 |
| 4,150,841 A * | 4/1979 | Ayotte et al. | ................ | 280/446.1 |
| 4,438,944 A * | 3/1984 | Della-Moretta | ................ | 280/446.1 |
| 4,502,557 A * | 3/1985 | Anderson | ................ | 180/14.2 |
| 4,771,838 A * | 9/1988 | Ketcham | ................ | 180/6.62 |
| 5,330,020 A * | 7/1994 | Ketcham | ................ | 180/14.2 |
| 5,332,052 A * | 7/1994 | Carnevale | ................ | 180/14.2 |
| 5,559,420 A * | 9/1996 | Kohchi | ................ | 180/68.5 |
| 6,039,134 A * | 3/2000 | Batanist | ................ | 180/14.1 |
| 6,419,037 B1 * | 7/2002 | Kramer et al. | ................ | 180/14.2 |
| 7,115,070 B2 * | 10/2006 | Stummer | ................ | 477/205 |
| 7,447,585 B2 * | 11/2008 | Tandy et al. | ................ | 701/70 |
| 7,513,321 B2 * | 4/2009 | Page, Jr. | ................ | 180/14.1 |
| 7,798,263 B2 * | 9/2010 | Tandy et al. | ................ | 180/14.6 |
| 7,931,100 B2 * | 4/2011 | Bender et al. | ................ | 180/14.2 |
| 8,100,426 B2 * | 1/2012 | Kronenberg | ................ | 280/411.1 |
| 8,214,108 B2 * | 7/2012 | Post et al. | ................ | 701/48 |
| 2002/0107627 A1 * | 8/2002 | Funke et al. | ................ | 701/70 |
| 2008/0236268 A1 | 10/2008 | McKeown et al. | | |

FOREIGN PATENT DOCUMENTS

| | | |
|---|---|---|
| DE | 2547362 | 4/1977 |
| DE | 2755184 | 6/1979 |
| DE | 3526813 | 1/1987 |
| DE | 102004029661 | 1/2006 |

OTHER PUBLICATIONS

English Abstract of DE 102004029661.

* cited by examiner

*Primary Examiner* — Kevin Hurley
*Assistant Examiner* — Michael Stabley
(74) *Attorney, Agent, or Firm* — Dykema Gossett PLLC

(57) ABSTRACT

To be able to simulate any desired kind of driving state with a test vehicle it is envisioned to connect an active secondary vehicle 2 to the front or rear of the test vehicle 1, and wherein the secondary vehicle 2 is equipped with its own drive and load device 3 by which the test vehicle 1 is braked and/or pushed additionally to its own deceleration and/or acceleration.

4 Claims, 2 Drawing Sheets

METHOD FOR TESTING A MOTOR VEHICLE AND A TEST VEHICLE WITH AN ACTIVE SECONDARY VEHICLE

BACKGROUND OF THE INVENTION

1. Field of the Invention

The present invention relates to a method for testing a motor vehicle on a test track and a test vehicle for conducting the tests on test track.

2. The Prior Art

During the development stage of motor vehicles, it is necessary to create certain driving states in order to test how a vehicle behaves under certain conditions. This can be done on special test stands, for example roller dynamometers, or on test tracks (whether in the form of a real roadway or a special test terrain is not important in this context). Both options have advantages and disadvantages. Test stands do not necessarily allow for any type of duplication that may be desired because they are unable to simulate real ambient conditions with every degree of accuracy. Therefore, testing on a test stand can always only give indications as to the real behavior of the motor vehicle on the real roadway (even if the real conditions are approximated very closely). A test track, in contrast, is naturally limited in terms of its possibilities dependent on its course through different environments, routes, etc. Consequently, it is not possible to generate an unlimited number of desired driving states on a test track. Moreover, a test on a test track depends in most cases also on environmental conditions (temperature, moisture) and the test driver (clutching times, pedal position(s), steering angle, etc.) and is thus not completely reproducible. Nevertheless, by choosing varied test tracks (for example, a route through an urban area or a high Alpine road, the "Grossglockner mountain road") it is, of course, possible to carry out different test runs on different types of roadways which, as any observer will understand, is a complex undertaking and only possible with limitations.

Known in the art are, for example, braking trailers that are hooked up to the primary vehicle and that are able to exercise braking forces on the primary vehicle, for example by hydraulic or pneumatic brakes on the braking trailer. A braking trailer of this kind is disclosed, for example, in DE 27 55 184 A1. Another braking trailer, as known from DE 10 2004 029661 A1, integrates a controlled load unit that allows for simulating total resistance to vehicular motion as well as trailer loads. The braking effect is achieved by the controlled conversion of mechanical into electrical energy via an electric generator. Consequently, braking trailers of this kind are only able to simulate certain driving states. But they are not suited for implementing comprehensive motor vehicle testing measures under varying driving conditions.

Therefore, it is the object of the present invention to provide a method for testing a motor vehicle as well as a test vehicle that allow for simulating any kind of desired driving states (within the physical possibilities) of a vehicle on a test track.

SUMMARY OF THE INVENTION

This object is achieved according to the invention by connecting an active secondary vehicle that is equipped with its own drive to the front or rear of the test vehicle and by which the test vehicle is braked and/or pushed additionally to the vehicle's own deceleration and/or acceleration. By way of the powered secondary vehicle it is now possible to apply any desired forces in the longitudinal direction and the most varied driving situations can be simulated and tested independently of the test track. But it is also possible to exclude or at least weaken the influence factor posed by the test driver because deviations that occur due to the test driver can be compensated for by the secondary vehicle, be it completely or in part. With such a secondary vehicle it is now also possible for the first time to test forward as well as backward driving action.

To apply transverse forces and/or moments to the test vehicle it is possible to provide individualized drive or brake action per wheel on at least one wheel of each side of the secondary vehicle. This way it is possible to set further driving states, thereby considerably expanding the testing possibilities.

The invention thus allows for modifying the sensor-actor interaction of the vehicle on the real test track by applying additional forces or moments in such a way that desired test maneuvers (driving states) are generated (within the physical possibilities). The active secondary vehicle according to the invention is employed as an actor for generating the additionally applied forces and moments.

If the secondary vehicle is connected to the testing vehicle via suitable kinematics, for example a four-bar linkage, and a coupling point of the four-bar linkage and/or the length of a linkage is adjusted between two associated coupling points, it is also easily possible to apply, additionally or optionally, transverse forces and/or moments to the vehicle. This is also easily achieved if one axle of the secondary vehicle is a steered axle.

Due to the possibility(-ies) of applying transverse forces and moments, it is also possible to improve the driving stability of the test vehicle and/or the secondary vehicle during the test run.

BRIEF DESCRIPTION OF THE DRAWINGS

The invention will be explained in further detail below using the attached exemplary, schematic and non-limiting figures, and wherein the figures demonstrate advantageous embodiments of the invention, wherein.

DETAILED DESCRIPTION OF THE PREFERRED EMBODIMENTS

Figure 1:
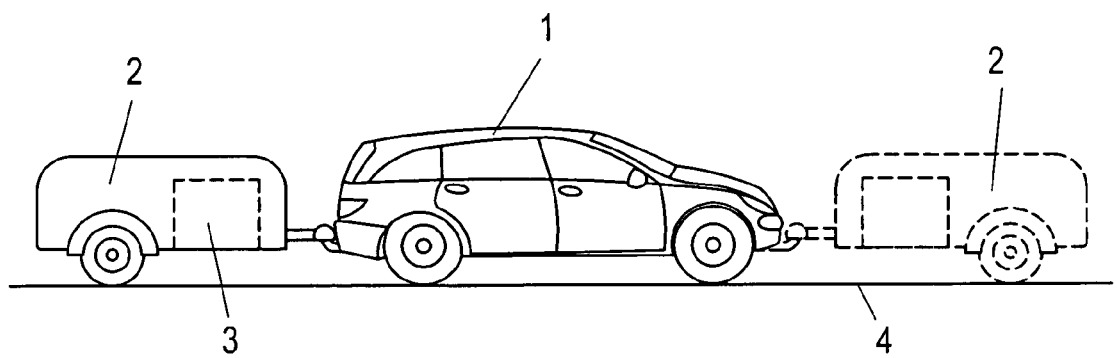
FIG. 1 shows the apparatus according to the invention including a motor vehicle with a secondary vehicle.

FIG. 1 depicts a typical test constellation with a test vehicle 1 on a test track 4, for example a real roadway or a course inside a testing terrain, executing certain driving maneuvers in order to test a certain driving behavior. To this end, the test vehicle 1 is equipped with its own drive, for example, a combustion or electrical engine that is not shown here, and typically a number of sensors that are disposed on the test vehicle 1 and able to detect and evaluate certain measured values (torque, speed, yaw rate, acceleration, etc.).

An active secondary vehicle 2 is hooked up to the test vehicle 1, and wherein the secondary vehicle 2 includes its own drive and load device 3 by which the secondary vehicle 2 can be actively decelerated and accelerated. It is not important in this context if the secondary vehicle has one axle, a twin axle or two or more axles. It is also conceivable that only one or that several axles are powered. The drive and load device 3 is, for example, an electrical device, such as an electrical synchronous machine. Further units can naturally be provided for supplying energy to drive 3 on the secondary vehicle 3, for example, a battery or a fuel cell and/or, for example, suitable power electronics for triggering the drive and load device 3. Naturally, it is also conceivable that different devices are available as decelerating and accelerating drive and load device 3 on the secondary vehicle 2, for example an electric motor for driving action and an eddy-current brake for braking action. But the secondary vehicle 2 could also be connected to the front end of the test vehicle 1, as indicated in FIG. 1 by the broken line outline of the secondary vehicle 2; it would then act like a tractor.

With this apparatus it is possible to apply, independently of the actual track, almost any desired load conditions to the test vehicle 1, which is why for the first time testing is now independent of the actual test track. For example, it is possible to test any kind of incline or gradient, different wind forces, entering and exiting wind cones, acceleration or deceleration under different loads, etc.

Figure 2:
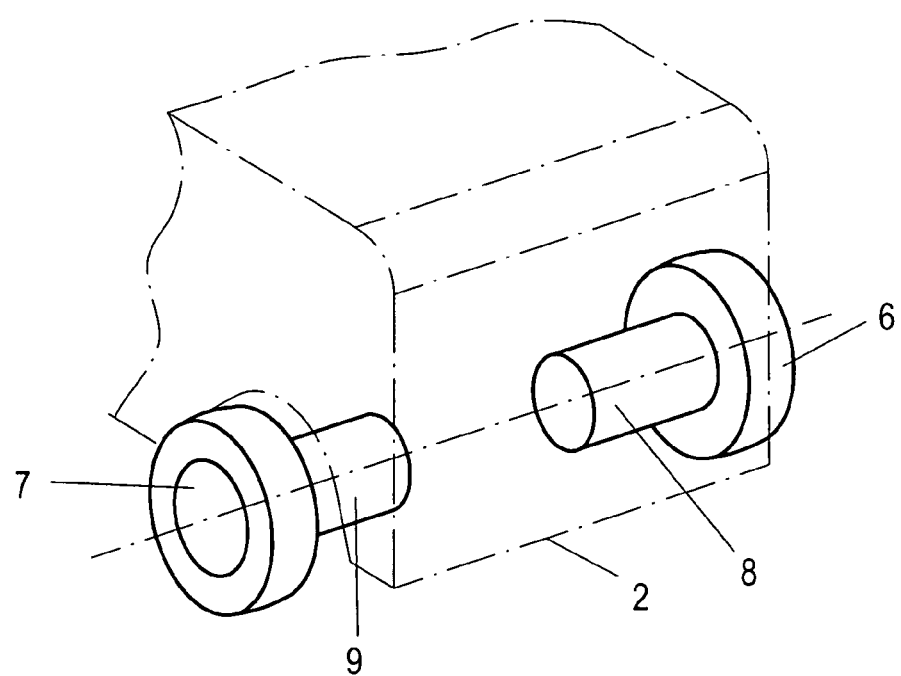
FIG. 2 shows a portion of a secondary vehicle with a wheel-individualized drive.

Advantageously, it is possible to provide at least one wheel 6, 7 on each side of the secondary vehicle that has its own drive and load device 8, 9 such as, for example, wheel hub motors as indicated in FIG. 2. By such a drive that is individualized per wheel it is possible to apply to vehicle 1, aside from longitudinal forces (by braking, pushing (and/or pulling)), transverse forces and moments around the vertical axis (yaw moments) as well. This provides a further degree of freedom during testing, and for the first time it is now possible to simulate, for example, driving states involving transverse forces in order to test, for example, the most varied vehicle stability systems (such as, for example, ABS, ESP, etc.). But it is also possible to simulate very specific driving states such as, for example, jumping a curb during parallel parking (for example, for testing automatic parking aids).

Figure 3:
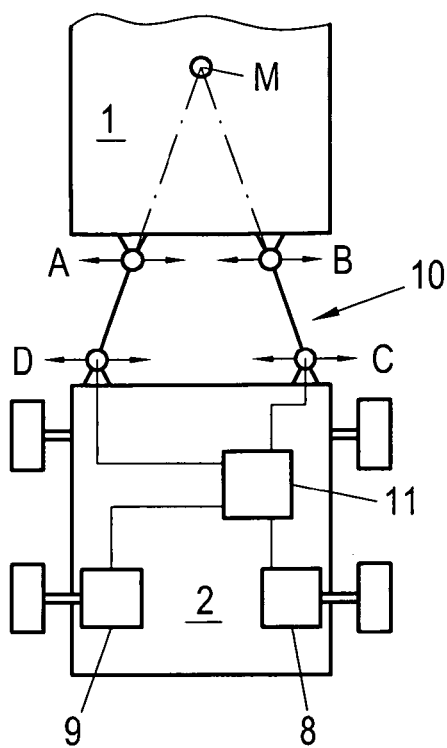
FIG. 3 shows a connection of the secondary vehicle to the vehicle by a four-bar linkage.

The coupling connection of the secondary vehicle 2 with the test vehicle can be achieved, for example, by conventional ball and socket trailer hitches as are customary on passenger cars, but also by bolt-type trailer hitches with a coupling mouth, eyelet and bolt or fifth wheel coupling and king pin, as commonly used on trucks. But it is also possible to provide a rigid hook-up connection. Coupling connections with suitable kinematics are also conceivable such as, for example, by a known four-bar linkage 10 as shown, for example, in FIG. 3. The geometry of the four-bar linkage 10 creates an instantaneous center of rotation M that is for reasons of stability preferably placed in the center of gravity or in the area of the center of gravity or the front axle of the test vehicle 1. The coupling points A, B, C, D of the four-bar linkage 10 can be fixed, or they can be adjustable (as indicated in FIG. 3 by the double arrows) to allow, for example, for connecting different secondary vehicles 2. It is not important if the coupling points are adjustable on the test vehicle 1, the secondary vehicle 2 or on both. As can be directly seen, by adjusting the coupling points A, B, C, D, the position of the instantaneous center of rotation M is changed.

But an active (which means controlled) adjustment of the coupling points A, B, C, D can also be used to apply further forces and/or moments to the test vehicle 1. To this end, it is possible to envision that the coupling points A, B, C, D are actively adjusted, for example, by a ball screw or a hydraulic actuator. Depending on the position that results for the instantaneous center of rotation M, transverse forces and/or moments are applied to the test vehicle 1 during deceleration or acceleration of the secondary vehicle 2. Thus, by the way in which the positioning or the active adjustment or the coupling points A, B, C, D are selected, it is possible to apply the corresponding additional forces or moments to the test vehicle 1.

It is similarly conceivable that the position of the instantaneous center of rotation M is changed by adjusting the length of the connecting rod between the coupling points A and D and/or B and C.

Figure 4:
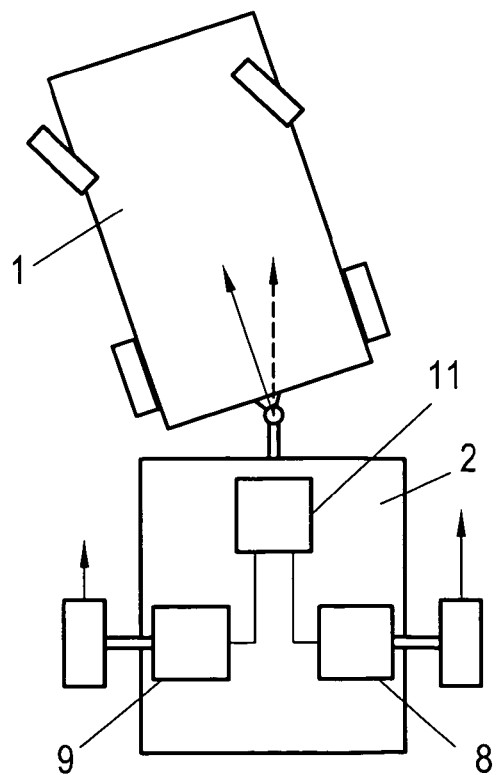
FIG. 4 shows a vehicle with secondary vehicle driving through a curve.

But the independent drives 8, 9 that are provided on both sides of the secondary vehicle 2 can also be used to apply the driving or braking force in the longitudinal direction of the test vehicle when the vehicle drives through a curve as shown, for example, in FIG. 4. To this end, the independent drives 8, 9 are triggered correspondingly to generate a force in the longitudinal direction of the test vehicle 1. But the independently powered wheels 6, 7 of the secondary vehicle can also be utilized to stabilize the secondary vehicle 2 to prevent the secondary vehicle 2 from swerving in certain driving situations.

The secondary vehicle 2 can also be implemented with a steered axle. This also provides for the possibility of applying transverse forces and/or moments to the test vehicle 1 or to stabilize the test vehicle 1 or secondary vehicle 2.

A control unit 11 can be provided on the secondary vehicle 2 for the purpose of adjusting the drive and load device(s) 3, 8, 9 and/or the geometry of the coupling connection that receives different measured values from sensors that are installed on test vehicle 1 and/or on the secondary vehicle 2 or set values that can be predetermined. The sensors can detect measured values from test vehicle 1, secondary vehicle 2 and/or also the environment. It is furthermore conceivable for the secondary vehicle to exchange control commands or data with the test vehicle 1, for example via a control unit disposed therein. For example, the secondary vehicle 2 can be connected to a vehicle bus in the test vehicle 1 for this purpose.

The invention claimed is:

1. A method for testing a test motor vehicle during a development stage, comprising the steps of:
    (a) providing an active secondary vehicle having a drive and load device capable of braking or accelerating a test motor vehicle,
    (b) attaching said active secondary vehicle to a front or rear of the test motor vehicle,
    (c) running the test motor vehicle with active secondary vehicle attached thereto over a certain course on a test track, and
    (d) applying at least one of forces and moments to the test motor vehicle by the active secondary vehicle to simulate varied driving situations of the test motor vehicle that are independent of the test track by providing individualized drive or brake action per wheel on at least one wheel at each side of the secondary vehicle using a control unit.

2. The method according to claim 1, wherein in step (b) the active secondary vehicle is attached to the test motor vehicle with a four-bar linkage at coupling points, and including a step of independently adjusting the coupling points of the four-bar linkage.

3. The method according to claim 1, wherein in step (b) the secondary vehicle is attached to the test motor vehicle with a four-bar linkage, and including a step of adjusting lengths of links extending between coupling points on respective vehicles.

4. The method according to claim 1, including a step of detecting test values of movement of said test motor vehicle and storing said test values in a control unit in said active secondary vehicle.

* * * * *